Patented Apr. 30, 1929.

1,711,036

UNITED STATES PATENT OFFICE.

JOHN S. BEEKLEY, OF WILMINGTON, DELAWARE, ASSIGNOR TO LAZOTE, INC., OF WILMINGTON, DELAWARE, A CORPORATION OF DELAWARE.

PROCESS OF PRODUCING HYDROGEN.

No Drawing.   Application filed September 10, 1926. Serial No. 134,750.

This invention relates to a method of producing hydrogen from gaseous mixtures of steam and hydrocarbons with the aid of a catalyst, and particularly to the heating of the catalyst for the purpose of maintaining the reaction.

A process for the conversion of a mixture of steam and hydrocarbons such as methane into hydrogen by a catalytic reaction is described in United States Patent No. 1,128,804. It depends upon the maintenance of the catalyst at a relatively high temperature, 700° C. This process may be utilized provided the necessary temperature can be maintained and if the presence of carbon monoxide in the product does not render it unsuitable for its intended use.

In the copending Williams application, Serial No. 118,600, an improved process for the catalytic production of hydrogen is described. This process can be operated at temperatures materially below 700° C. and is particularly effective because the primary reaction proceeds as follows:

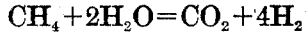

$$CH_4 + 2H_2O = CO_2 + 4H_2$$

This reaction results in the production of the minimum quantity of carbon monoxide in the gaseous mixture and the hydrogen is, consequently, better adapted for utilization for the hydrogenation of fats and the production of synthetic ammonia, for example.

Catalytic reactions between hydrocarbons and steam are strongly endothermic. The reaction above described results, for example, in a loss of 39.3 cal. and it is necessary to supply a corresponding amount of heat in order that the reaction may proceed. An economical method of supplying the heat consists in introducing a sufficient amount of oxygen, for example, in the form of air to the steam-hydrocarbon mixture to permit a portion of the gas to burn. I have observed, however, that the introduction of oxygen for this purpose is sometimes attended by a sudden and complete loss of activity of the catalyst. While the reason for this change is obscure, it may be assumed that the presence of oxygen is the direct or indirect cause. In any event, I have observed this phenomenon only when the mixture contained oxygen.

It is the object of the invention to provide an improved process of producing hydrogen by a catalytic reaction between steam and a hydrocarbon which permits the production of heat directly in contact with the catalyst by the introduction of sufficient oxygen with a gas other than the hydrocarbon which is capable of burning in the presence of oxygen.

I have discovered that oxygen may be introduced with the gaseous mixture of steam and hydrocarbons provided there is also present in the mixture a sufficient quantity of a suitable reducing gas. The term "reducing gas" is employed in the specification and claims to designate any gas or gaseous mixture consisting wholly or in part of hydrogen or carbon monoxide. Thus, for example, water gas free from contact poisons may be employed advantageously. To accomplish the purpose, therefore, of the invention I mix with the steam and hydrocarbons a reducing gas as specified and an amount of oxygen preferably in the form of air to accomplish the combustion of the reducing gas. The proportions of reducing gas and oxygen will depend upon the amount of heat required to maintain the desired temperature in the reaction chamber and will vary somewhat, depending on the nature and size of the apparatus and on the composition of the hydrocarbon-containing gas which is employed in the process. Thus, if the hydrocarbon-containing gas includes carbon monoxide, the amount of reducing gas to be added will be smaller than otherwise. Likewise, if a high temperature is to be maintained the quantities of reducing gas and oxygen to be added will be increased.

Although the invention is not limited by any particular theory of operation, it appears probable that ordinarily methane or other hydrocarbons do not possess sufficient affinity for oxygen to prevent the latter from combining to some extent at least with the catalyst and that consequently the catalyst becomes oxidized and thus loses its power. If, on the other hand, a sufficient amount of reducing gas is added the oxygen combines readily therewith and oxidation of the catalyst is more or less completely inhibited. This theory is supported by the observed fact that the passage of a mixture of 15 volumes of methane free from contact poisons, 150 volumes of steam, and 20 volumes of air over a catalyst consisting of nickel and alumina at 500° C. resulted in a practically complete loss of activity of the catalyst in 10 minutes. The activity of the catalyst remained substantially unimpaired for many hours, however, when 8 volumes of pure carbon monoxide were added to the gaseous mixture prior to contact thereof with the catalyst, the conditions of operation being otherwise the same.

The reducing gas which is mixed with the steam and hydrocarbons may be derived from any source but it is advantageous to utilize for this purpose a portion of the gaseous mixture which has already passed over the catalyst. Thus by the operation of the process a gas consisting principally of hydrogen is obtained and a portion of this product can be diverted and added to the entering gaseous mixture, the hydrogen in this case serving as the reducing gas and being consumed by combustion with the oxygen in the mixture to produce the heat necessary for the maintenance of the reaction.

Although the invention is not confined to the employment of any particular hydrocarbon, the hydrocarbons of the paraffin series such as methane and ethane, which are the predominating constituents of natural gas and coke-oven gas, are especially adapted for this utilization. The oxygen may be supplied in any suitable form, that is, as more or less pure oxygen, air or other oxygen-containing gases.

In carrying out the invention I prefer to employ a catalyst such as that described in the Williams application above mentioned. Such a catalyst may consist of nickel with a promoter. Among the substances which are suitable as promoters are cerium oxide, yttrium oxide, thorium oxide, zirconium oxide, molybdenum oxide, vanadium oxide, tungsten oxide, uranium oxide, titanium oxide, glucinum oxide, chromium oxide, aluminum oxide, manganese oxide, silicon oxide, tantalum oxide, boron oxide, zinc oxide, cadmium oxide, potassium oxide and calcium oxide. While the addition of promoters to nickel catalysts is especially advantageous since it permits the production of hydrogen from hydrocarbons and steam at temperatures below 700° C., the usefulness of such promoted nickel catalysts is not limited to these temperatures. Moreover, the invention does not depend upon these particular catalysts and the operation can be conducted, therefore, at higher temperatures and with the catalyst as described, for example, in U. S. Patent No. 1,128,804.

As an example of the invention I prefer the following procedure: Crush pumice stone and screen to 8–14 mesh. Wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C. until the nitrogen oxides have been expelled. Place the product in a silica tube in an electrically heated furnace and heat for one hour in a stream of pure hydrogen at 400° C. Prepare then a gaseous mixture from a gas such as high-methane natural gas in the proportion of 15 volumes of methane, 150 volumes of steam, 20 volumes of air and 8 volumes of pure carbon monoxide, the constituents being previously freed from contact poisons by passage of the gases other than air over hot copper and through activated charcoal, for example. This mixture is then passed over the catalyst at a temperature of 500° C. at a space velocity of 250 based on methane. (The space velocity is the volume of gas flowing under standard conditions of temperature and pressure per unit volume of catalyst per hour.) In passing over the catalyst the carbon monoxide and the oxygen of the air combine to produce the heat necessary for the maintenance of the reaction and the hydrocarbons are decomposed in the presence of steam to produce hydrogen. In the foregoing example, the carbon monoxide may be replaced either wholly or in part by an equal volume of hydrogen. The hydrogen is obtained preferably by the catalytic conversion of previous portions of the steam and hydrocarbon.

In the practice of the invention it is necessary to observe precautions to avoid the presence of even small proportions of certain substances which act as catalyst poisons. Among such substances are the halogens, such as chlorine, and compounds of sulphur. Chlorides should be excluded, therefore, in the preparation of the catalyst and sulphur compounds should be removed from the gases before contact thereof with the catalyst if the best results are to be obtained.

The reaction can be conducted in any suitable apparatus which is adapted to facilitate the passage of the gases in contact with the catalyst and the conservation of the heat. Conservation is particularly important in view of the endothermic nature of the reaction and the necessity for supplying heat thereto. Consequently it is desirable to employ suitable heat exchangers whereby the heat of the outgoing gases may be transferred to the incoming gaseous mixture.

While the invention has been described with reference to particular details of operation these are not essential to the practice thereof and various changes may be made in the procedure as well as in the apparatus employed in connection therewith without departing from the invention or sacrificing any of the advantages thereof.

I claim:—

1. A process for the manufacture of hydrogen by submitting a mixture of steam and a gaseous hydrocarbon to the action of a heated catalyst, which comprises adding oxygen and a reducing gas to said mixture and passing it over the catalyst.

2. A process for the manufacture of hydrogen by submitting a mixture of steam and a gaseous hydrocarbon to the action of a heated catalyst, which comprises adding oxygen and a reducing gas containing hydrogen to said mixture and passing it over the catalyst.

3. A process for the manufacture of hydrogen by submitting a mixture of steam and a gaseous hydrocarbon to the action of a heated catalyst, which comprises adding to said mixture oxygen and a portion of the product obtained by the catalytic reaction of previous portions of hydrocarbon and steam and passing it over the catalyst.

4. A process for the manufacture of hydrogen by submitting a mixture of steam and methane to the action of a heated catalyst, which comprises adding oxygen and a reducing gas to said mixture and passing it over the catalyst.

5. A process for the manufacture of hydrogen by submitting a mixture of steam and methane to the action of a heated catalyst, which comprises adding oxygen and a reducing gas containing hydrogen to said mixture and passing it over the catalyst.

6. A process for the manufacture of hydrogen by submitting a mixture of steam and methane to the action of a heated catalyst, which comprises adding to said mixture oxygen and a portion of the product obtained by the catalytic reaction of previous portions of methane and steam and passing it over the catalyst.

7. A process for the manufacture of hydrogen, which comprises subjecting a mixture of steam and a gaseous hydrocarbon to the action of a heated catalyst in the presence of oxygen and a reducing gas in proportions to burn and provide thereby heat necessary to support the catalytic conversion of the steam and hydrocarbon.

8. A process for the manufacture of hydrogen by a reaction between steam and a gaseous hydrocarbon, which comprises providing heat necessary for the reaction by effecting simultaneously with the reaction the combustion with oxygen of a reducing gas introduced with the hydrocarbon.

9. A process for the manufacture of hydrogen by a catalytic reaction between steam and a gaseous hydrocarbon, which comprises introducing oxygen and a reducing gas admixed with the steam and hydrocarbon to a heated catalyst.

10. A process for the manufacture of hydrogen by submitting a mixture of steam and a gaseous hydrocarbon to the action of a heated catalyst, which comprises passing such a mixture containing also oxygen and a sufficient quantity of a reducing gas to combine with the oxygen over the catalyst.

11. A process for the manufacture of hydrogen by submitting a mixture of steam and a gaseous hydrocarbon to the action of a heated catalyst, which comprises adding oxygen and a quantity of a reducing gas sufficient to combine with the oxygen to said mixture and passing it over the catalyst.

12. A process for the manufacture of hydrogen by submitting a mixture of steam and a gaseous hydrocarbon to the action of a heated catalyst, which comprises adding oxygen and a quantity of a reducing gas containing hydrogen sufficient to combine with the oxygen to said mixture and passing it over the catalyst.

13. A process for the manufacture of hydrogen by submitting a mixture of steam and a gaseous hydrocarbon to the action of a heated catalyst, which comprises adding to said mixture oxygen and a portion of the product obtained by the catalytic reaction of previous portions of hydrocarbon and steam sufficient to combine with the oxygen and passing it over the catalyst.

14. A process for the manufacture of hydrogen by the catalytic reaction of steam and a gaseous hydrocarbon, wherein the gaseous mixture going to the reaction consists of steam, a hydrocarbon, oxygen and a reducing gas.

In testimony whereof I affix my signature.

JOHN S. BEEKLEY.